United States Patent [19]
Brunner et al.

[11] 3,818,206
[45] June 18, 1974

[54] MARK-SPACE MODULATOR FOR A TIME-DIVISION MULTIPLIER

[75] Inventors: Julius Brunner, Nurnberg; Manfred Schwendtner, Schwarzenbruck; Gunter Steinmuller, Nurnberg, all of Germany

[73] Assignee: Siemens Aktiengesellschaft, Munich, Germany

[22] Filed: Feb. 8, 1973

[21] Appl. No.: 330,618

[30] Foreign Application Priority Data
Feb. 10, 1972 Germany............................ 2206223

[52] U.S. Cl............ 235/194, 235/151.31, 324/142, 328/160
[51] Int. Cl......................... G06g 7/16, G01r 21/00
[58] Field of Search ......... 235/151.31, 194; 324/74, 324/118, 140 R, 140 D, 141, 142; 328/160, 196; 332/9 T

[56] References Cited
UNITED STATES PATENTS

| | | |
|---|---|---|
| 3,466,460 | 9/1969 | Connolly........................ 235/194 X |
| 3,500,200 | 3/1970 | Woodhead...................... 235/194 X |
| 3,558,928 | 1/1971 | Remy et al...................... 328/160 X |
| 3,602,843 | 8/1971 | DeVries.......................... 235/194 X |
| 3,629,567 | 12/1971 | Bruggemann...................... 235/194 |

FOREIGN PATENTS OR APPLICATIONS 1,901,885  7/1970  Germany............................ 324/142

Primary Examiner—Malcolm A. Morrison
Assistant Examiner—Jerry Smith
Attorney, Agent, or Firm—Kenyon & Kenyon Reilly Carr & Chapin

[57] ABSTRACT

An improved mark-space modulator for an electronic time division multiplier in which an astable multivibrator which is providing the timed output pulses is controlled by two current source transistors having their bases connected via a resistor, with the base of one additionally connected to ground and the base of the other to the voltage to be quantitized. A current source provides a fixed current to the two transistors which is split according to the voltages at their bases such as to cause the multivibrator to output pulses having a mark-space ratio $[(t_2-t_1)/(t_2+t_1)]$ which is proportional to the input voltage.

5 Claims, 1 Drawing Figure

PATENTED JUN 18 1974 3,818,206
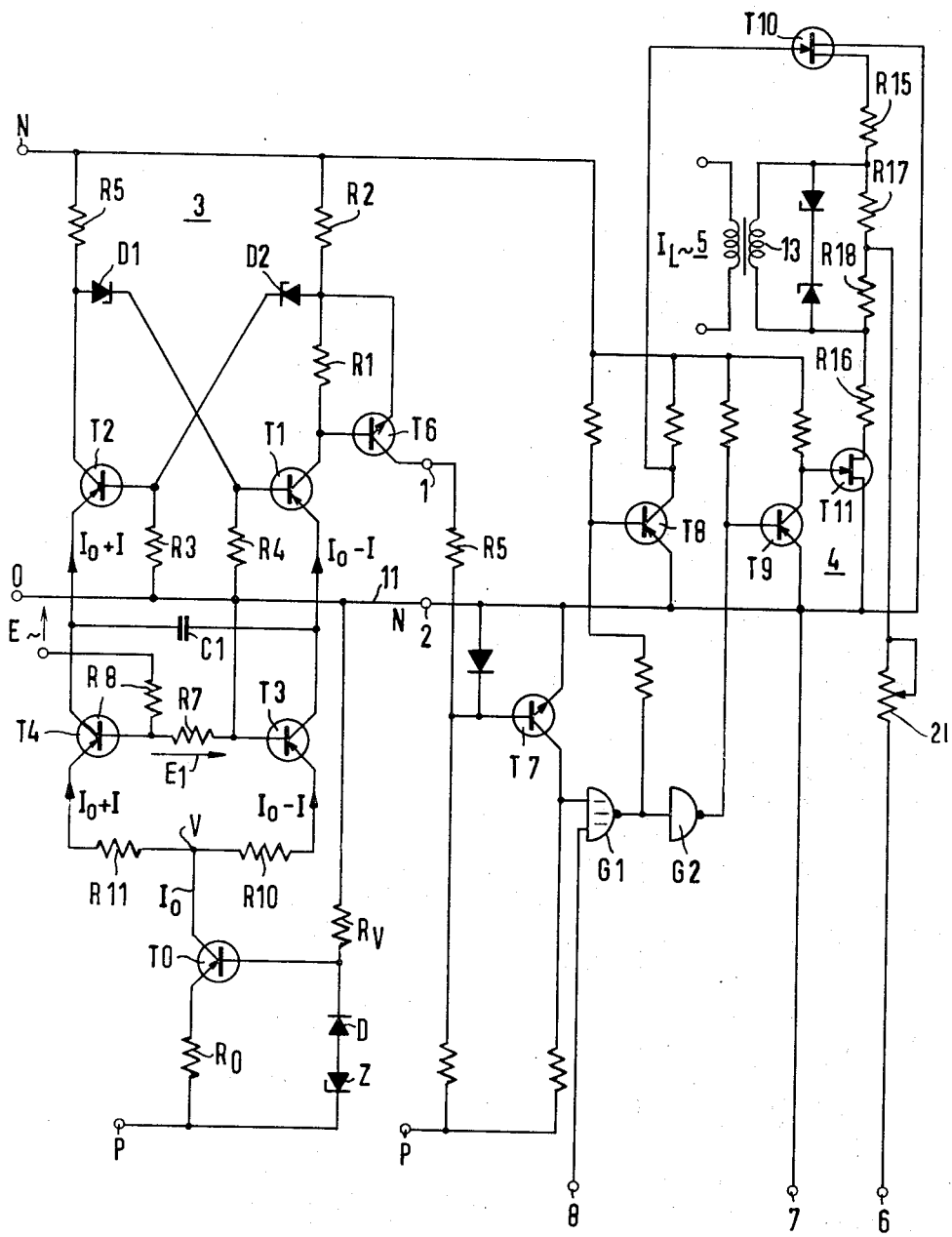

MARK-SPACE MODULATOR FOR A TIME-DIVISION MULTIPLIER

BACKGROUND OF THE INVENTION

This invention relates to time division multiplication in general and more particularly to a mark-space generator for use in such a multiplier particularly when used for measuring power in a watt-hour meter. The concept of time division multiplication is well known in the art. In general terms, one of the quantities to be multiplied is converted into a time pulse which is proportional to the magnitude of the quantity to be multiplied. Through the use of this time, and the other voltage representing the other quantity, it is possible to obtain a multiplication through averaging. That is to say, the voltage provided at the output of an averaging circuit will be equal to the voltage input times the time that the input was present. If the time turns out to be another quantity which is to be used in a multiplication, then the two quantities have, in effect, been multiplied. The basic concepts involved are discussed in *Handbook of Automation, Computation, and Control*, edited by E. M. Grabbe, S. Ramo, and D. E. Wooldridge, Vol. 2, page 23-05 et. sec. (JOhn Wiley & Sons, Inc., New York 1965)

This concept has found application in watt-hour meters in which a voltage and a current must be multiplied to obtain power. To obtain energy the power may then be integrated. The nature of an integrator is such that it can perform the necessary averaging at the same time as it is integrating. One such multiplier is disclosed in German published patent application No. 1,591,963. One of the essential steps in performing time division multiplication is that of converting or quantitizing one of the quantities, e.g., a voltage, into pulses of proportional duration. The apparatus which performs this function, can be termed a mark-space generator or a mark-space modulator. In the above referenced German application, as in the present invention, an emitter-coupled astable transistor multivibrator is used in generating the timed pulses. In the German application above, the emitters of two additional transistors are used to provide current sources to the transistors in the multivibrator to control the switching thereof. The emitters of these current source transistors are connected to the positive terminal of a voltage source through individual resistors. The bases of the two transistors are coupled to the secondary winding of a voltage transformer, the center tap of which is connected to a constant reference voltage source. The primary of the voltage transformer is coupled to the voltage which is one of the quantities to be multiplied. The voltage at the output of the secondary of the transformer is thus proportional to the voltage to be multiplied, and is then used to control the current source transistors, which in turn control the multivibrator so that it outputs pulses of a duration which are proportional to the voltage input. Although this arrangement works quite well, it has one serious disadvantage in that it requires a voltage transformer. The use of the voltage transformer not only limits the possible applications of this multiplier, but also represents an element which has a high cost, thereby increasing the overall expense of the multiplier.

Thus, there is a need for a time division multiplier, and in particular, a mark-space generator for use in such a multiplier which does not require the use of a costly and limiting voltage transformer.

SUMMARY OF THE INVENTION

The present invention provides a time division multiplier having a mark-space generator which maintains the required high accuracy without the use of a voltage transformer. By doing so, the cost of the multiplier is substantially reduced and it can be used in many other areas of application where it formerly could not. To provide the required current source control to the astable multivibrator, the bases of the two transistors which are used as current sources are connected to each other through a resistor. The base of one transistor is further connected to the neutral or ground point of the voltage to be measured. (Application of the circuit in a watt-hour meter is assumed throughout the discussion herein. Thus, the two quantities being measured are an AC voltage and an alternating current. As in the circuit of the German application, the voltage is the quantity which is being converted into a time pulse by the astable multivibrator.) The base of the other transistor is coupled through a series resistor to the voltage which is to be measured. The emitters of the two current source transistors are connected together through two resistors of equal value. At the junction of the two emitter resistors, a constant current source is provided. The manner in which the two current source transistors are coupled to each other and to the fixed current source, results, assuming a current of $2I_0$ out of the fixed current source, in a current through one which is $I_0 - I$ and a current through the other which is $I_0 + I$. It can be shown that the current I is proportional to the voltage E being measured, and thus, the timed pulses out of the multivibrator which are proportional to I will also be proportional to E, the voltage being measured.

BRIEF DESCRIPTION OF THE DRAWING

The single FIGURE is a schematic of the preferred embodiment of the circuit of the present invention.

DETAILED DESCRIPTION OF THE PREFERRED EMBODIMENT

The circuit of the figure can be broken down to three basic elements, the mark-space generator or modulator is indicated generally as 3, the amplitude modulator as 4 and the second input to be multiplied, the source of the current quantity, as 5. The astable multivibrator of the mark-space generator 3 comprises the transistors T1 and T2 along with their associated circuit elements. The collectors of T1 and T2 are each coupled through suitable resistors respectively R1 and R2 and R5 to the negative terminal of a DC reference voltage. The bases of T1 and T2 are connected respectively to the ground buss 11 which will be coupled both to the neutral, indicated as 0, of the AC voltage being measured, and to the other side of the reference power supply. The base of T1 is coupled to the collector of T2 through a zener diode D1 and the base of T2 coupled to the collector circuit of T1 thorugh a zener diode D2 in conventional fashion. The output of the astable multivibrator is taken from the collector of T1 to a transistor T6 to be described below. The emitters of T1 and T2 are coupled respectively to the current source transistors T3 and T4.

The bases of T3 and T4 are connected together through a resistor R7. The base of T3 is additionally connected to the ground buss 11. The base of T4 is connected through a resistor R8 (this resistor may be eliminated in some applications) to the voltage to be used in the multiplication, designated E. The emitters of transistors T3 and T4 are connected respectively through resistors R10 and R11, of equal value, to a fixed current source transistor TO. TO has its emitter connected through a resistor RO to a positive voltage source indicated as P. The base of TO is biased using a resistor Rv, a diode D and a zener diode Z in series. This series combination is connected between the positive voltage terminal P and the ground buss 11 with the base of TO connected to junction of Rv and D. The diode D provides temperature compensation for TO in a well known manner.

Transistor TO, because of the manner in which it is biased, will provide at the point V a constant current which may be designated as $2I_0$. At point V the current $2I_0$ will divide into two paths, one, provided to T2 will have a current $I_0 + I$ and the other to the emitter of T3 which will have a current $I_0 - I$. The fact that the current I is proportional to the voltage E can be shown by the below equations. The voltage $E_1$ across the resistor R7 may be expressed as follows:

$$E_1 = (E\ R7/R7+R8)$$

We can also say that:

$$E_1 = -(I_0 - I)R10 + (I_0 + I)R11$$

Since R10 equals R11 equals R the equation for I becomes:

$$I = (E_1/2R) = (R7/R7+R8)\ (E/2R)$$

or, I is proportional to V. Since, in this type of circuit, the time, $t_1$, that transistor T1 will be on is proportional to $(I_0 - I_1)$ and the time $t_2$ that transistor T2 will be on is proportional to $(I_0 + I)$, in each case, the on time being directly proportional to the current in its emitter path, it is possible to write the following equation for the mark-space ratio:

$$(t_2 - t_1/t_2 + t_1) = [(I_0 + I) - (I_0 - I)/(I_0 + I) + (I_0 - I)]$$
$$= (I/I_0)$$

Thus, since $I_0$ is a constant value, the ratio $(t_2 - t_1/t_2 + t_1)$ is proportional to I and thus, also proportional to the voltage E.

Thus, at the output of transistor T1 there will be a series of pulses with an on time $t_1$ proportional to $I_0 - I$ and an off time $t_2$ proportional to $I_0 + I$. This output will turn on transistor T6 which will provide the same pulses at its collector output at a shifted voltage level. These shifted pulses are in turn used to control transistor T7 which has its collector connected to the positive reference voltage through a resistor. Transistor T7 will provide the same pulses at its output, but at a suitable logic level to be input to the gate G1. Gate G1 will be an exclusive OR gate. That means, that only if one of its inputs is high, and the other input low, will it have a high or one output. If both inputs are high, or both inputs are low, it will have a low or zero output. Assume for the present, that the input on terminal 8 into gate G1 is at a high or a 1 level. The pulses output from transistor T7 will be alternately high and low. Each time a high pulse is provided from T7 to gate G1, both inputs will be high and the gate will have a low output. Each time a low input is provided, there will be one input high and one input low fulfilling the exclusive OR condition, and a one or a high output will result, Thus, with a high or one at terminal 8, gate G1 will act as an inverter. The output of gate G1 is provided as an input to a gate G2 which will preferably be a Nor gate to act as an inverter, to invert the pulses output by gate G1. In this way, gates G1 and G2 provide complementary outputs.

Gate G1 has its output coupled through a resistor to the base of a transistor T8. Similarly, gate G2 is coupled to a transistor T9. Transistors T8 and T9 are used for the purpose of level shifting in order to provide respective inputs to field effect transistors (FET) T10 and T11. Each time a high output results on gate G1, transistor T8 will be held off thus causing the negative voltage output resulting therefrom to turn off the field effect transistor T10. Similarly, each time gate G2 has a high output, transistor T9 will be held off and field effect transistor T11 turned off.

At this point, it might be well to review what is happening in the circuit to establish the relationship between the times $t_1$ and $t_2$ and the FET switches T10 and T11. During the time $t_1$, transistor T1 will have an output which will turn on transistor T6, which will, in turn, turn on transistor T7, and cause the output of gate G1 to go from a high to a low output. This low output will turn off transistor T8 and cause FET T10 to be closed. During the time period, $t_2$, transistor T1 will be off, as will transistors T6 and T7, thus causing gage G1 to have a high output and gate G2 to have a low output. In this situation, the output of gate G1 will cause transistor T8 to be on opening the FET T10. The high output of gate G2 will turn transistor T9 off causing the FET T11 to be closed. Thus, during the time period $t_1$ the FET switch T11 will be opened, and during the time $t_2$, the FET switch T10 will be opened.

The time periods which T10 and T11 are opened bear the above mentioned relationship to the first quantity to be multiplied, the input voltage E, as described herein above. The second quantity designated $I_L$ is provided as an input to a current transformer 13. The secondary of the current transformer is placed across a pair of equal load resistors R17 and R18. The center tap of these two resistors is provided through a variable resistor 21 to one of the output terminals designated as 6. The other side of resistor R17 is coupled through a resistor R15 to the FET switch T10 which has its other terminal connected to the ground bus 11. The resistor R18 has its other end connected through resistor R16 to the FET switch T11 which similarly has its other terminal connected to the bus 11. The other output terminal 7 is taken from the bus 11. At this point, it should be noted that the frequency of the astable multivibrator 3 will be established to greatly exceed the frequency of the ac voltage and current being measured. Thus, for practical purposes, for a single cycle at least, the current $I_L$ will be constant. During time period $t_1$, the voltage R18 will be provided across the output terminals 6 and 7 by the switching action of the FET switch T11. During the time period $t_2$, the voltage across the resistor R17, which will be equal but of opposite pluarity, will be provided across the output terminals through the switch T10. These output terminals will be coupled to a quantitizer, for example, a capacitor. Over one cycle, i.e., $t_1$ plus $t_2$, the output voltage across the terminal 6 and 7 will be $V_i\ t_2 - V_i\ t_1$, where $V_i$ is a voltage proportional to the current $I_L$. This results in an output which is equal to $V_i$ times $t_2 - t_1$, or a voltage which is proportional to E times a voltage proportional $I_L$, the power in the circuit being measured. The energy consumption may then be measured by integrating this power with respect to time. Hence, the use of a capacitor or the like across terminals 6 and 7. Since the capacitor will not have an unlimited voltage capability, it is necessary that at some predetermined point charging be stopped and discharging started. Thus, means will be provided in the quantitizer to change the output to terminal 8 when this level is reached. At this point, the input on terminal 8 will go from a high to a low input. This will effectively reverse the polarities of the outputs of gate G1 and G2 and all the elements controlled thereby. Thus, if as we assumed, the voltage during the time $t_2$ was positive, and the voltage during the time period $t_1$ negative, with an overall result of a net positive charging voltage from the output terminals 6 and 7, now, during the time period $t_2$, the output voltage will be negative and during the time period $t_1$, the output voltage will be positive resulting in a net negative output which will cause the capacitor to discharge. When the capacitor is fully discharged, the output to terminal 8 may again be reversed. With the predetermined level at which switching at terminal 8 occurs known, it is then only necessary that the quantitizer be designed such as to keep track of the time required for each charging and discharging in order that it be able to provide a watt-hour output. Such circuits are well within the skills of those skilled in the art and are not within the scope of this disclosure.

Thus, an improved time division multiplier which permits generating mark-space outputs representative of one of the quantities to be multiplied, without the use of a voltage transformer and which is particularly useful in watt-hour meters and the like, has been shown. Although a specific embodiment has been illustrated and described, it will be obvious to those skilled in the art that various modifications may be made without departing from the spirit of the invention which is intended to be limited solely by the appended claims.

What is claimed is:

1. In a time-division electronic multiplier which is particularly useful in a watt-hour meter, an improved mark-space modulator comprising:
   a. a two transistor emitter coupled astable multivibrator;
   b. a first current source transistor having its collector coupled to the emitter of one transistor in said multivibrator and its base coupled to ground;
   c. a second current source transistor having its collector coupled to the emitter of the other transistor in said multivibrator and its base coupled to the voltage to be used in the watt-hour computation;
   d. a first resistor coupling the bases of said first and second transistors;
   e. a pair of second resistors of equal value in series, coupling the emitters of said first and second transistors; and
   f. a constant current source coupled to the junction of said second resistors.

2. The invention according to claim 1 wherein the base of said second transistor is coupled to said voltage through a third resistor.

3. The invention according to claim 1 wherein said current source comprises:
   a. a third transistor having its collector coupled to said junction and its emitter coupled through a resistor to a source of DC voltage;
   b. a zener diode having one side coupled to said DC voltage; and
   c. an additional resistor havings its one side coupled to ground and its other side coupled to said zener diode and to the base of said third transistor.

4. The invention according to claim 3 wherein said multivibrator is connected to a negative DC source and the DC voltage to which said zener diode and third transistor are coupled is positive.

5. The invention according to claim 3 and further including a diode interposed in series between said zener diode and said additional resistor and wherein said third transistor base is coupled to the junction of said diode and said additional resistor, said diode providing temperature compensation for said third transistor.

* * * * *

UNITED STATES PATENT OFFICE
CERTIFICATE OF CORRECTION

Patent No. 3,818,206          Dated June 18, 1974

Inventor(s) Julius Brunner et al

It is certified that error appears in the above-identified patent and that said Letters Patent are hereby corrected as shown below:

In column 4, line 28, change "...thus causing gage G1..."

to ---...thus causing gate G1...---

In column 4, line 58, change "...the voltage R18..."

to ---...the voltage across R18...---

Signed and sealed this 7th day of January 1975.

(SEAL)
Attest:

McCOY M. GIBSON JR.
Attesting Officer

C. MARSHALL DANN
Commissioner of Patents